United States Patent
Paley et al.

(10) Patent No.: US 9,300,722 B2
(45) Date of Patent: Mar. 29, 2016

(54) AUTO-TRIMMING OF MEDIA FILES

(75) Inventors: Joseph Paley, Oakland, CA (US);
Matthew E. Beebe, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 875 days.

(21) Appl. No.: 12/984,541

(22) Filed: Jan. 4, 2011

(65) Prior Publication Data
US 2011/0167337 A1 Jul. 7, 2011

Related U.S. Application Data

(60) Provisional application No. 61/292,470, filed on Jan. 5, 2010.

(51) Int. Cl.
| | |
|---|---|
| G06F 17/00 | (2006.01) |
| H04L 29/08 | (2006.01) |
| G06F 17/30 | (2006.01) |
| H04L 29/06 | (2006.01) |
| G06T 3/40 | (2006.01) |

(52) U.S. Cl.
CPC .......... *H04L 67/06* (2013.01); *G06F 17/30017* (2013.01); *G06F 17/3082* (2013.01); *G06F 17/3089* (2013.01); *G06F 17/30781* (2013.01); *G06F 17/30796* (2013.01); *G06F 17/30799* (2013.01); *G06F 17/30817* (2013.01); *G06F 17/30858* (2013.01); *G06T 3/4092* (2013.01); *H04L 63/08* (2013.01); *H04L 65/602* (2013.01); *H04L 67/02* (2013.01); *H04L 67/04* (2013.01); *H04L 67/2828* (2013.01)

(58) Field of Classification Search
CPC ............... G06F 17/30017; G06F 17/30781; G06F 17/30817; G06F 17/3089; G06F 17/30796; G06F 17/30799; G06F 17/3082; G06F 17/30858; H04L 67/02; H04L 63/08; H04L 65/602; H04L 67/04; H04L 67/2828; H04L 67/06; G06T 3/4092
USPC .................................................. 715/252, 202
See application file for complete search history.

(56) References Cited

U.S. PATENT DOCUMENTS

| | | | |
|---|---|---|---|
| 2002/0069218 A1* | 6/2002 | Sull et al. ................ 707/501.1 |
| 2002/0161911 A1* | 10/2002 | Pinckney et al. ............ 709/231 |
| 2006/0064645 A1* | 3/2006 | Neven et al. .................. 715/753 |
| 2006/0259588 A1* | 11/2006 | Lerman et al. ................ 709/219 |
| 2007/0174774 A1* | 7/2007 | Lerman et al. ................ 715/723 |
| 2008/0072261 A1* | 3/2008 | Ralston et al. .................. 725/62 |
| 2008/0244410 A1* | 10/2008 | Schormann .................... 715/723 |
| 2010/0235857 A1* | 9/2010 | Lestage et al. .................. 725/37 |
| 2010/0289904 A1* | 11/2010 | Zhang et al. ............... 348/207.1 |

* cited by examiner

*Primary Examiner* — Nathan Hillery
(74) *Attorney, Agent, or Firm* — Mahamedi Paradice LLP

(57) ABSTRACT

A system (and a method) is disclosed for processing a media file for transmission. The system determines a size of the media file and a threshold size for transmission of the media file to a destination. In responsive to the size of the media file exceeding the threshold size for the destination, the system sets a crop window for the media file, the crop window within the threshold size and provides for display an overlay of the crop window relative to the media file. The system generates a cropped media file based on a position of the overlay of the crop window relative to the media file. The generated cropped media file has a size within the threshold size. The system transmits the cropped media file to the destination.

20 Claims, 6 Drawing Sheets (1)

(2)

610a  610  (3)  610b

AUTO-TRIMMING OF MEDIA FILES

CROSS REFERENCE TO RELATED APPLICATIONS

This application claims a benefit of, and priority to, U.S. Provisional Application No. 61/292,470, filed Jan. 5, 2010, which is incorporated by reference in its entirety.

BACKGROUND

1. Field of Art

The disclosure generally relates to the field of transmission of media files, for example, across a network.

2. Description of Art

Media files such as video files often can be large in size, for example, 5 megabytes (MB) or larger. In many instances these large files cannot be transmitted from a source or across a network or cannot be received at a destination due to size constraints at the source, network or destination. For example, if there is a size constraint for files that can be transmitted from the source or across the network, the video file will not be transmitted if that constraint is exceeded. If there is a size constraint for files that can be received at the destination, the video file will not be delivered if that constraint is exceeded. This will result in a "message bounce" back to the sender.

In an attempt to circumvent the size constraints placed within the network, compression techniques have been applied. However, their application is inconsistent. For example, application of compression techniques may not sufficiently reduce the size of the video file. Others compression techniques require extensive trial and error before an appropriate size for transmission is found. Further, some compression techniques could render the video file unwatchable. Moreover, all of these techniques do not provide the sender information on whether a video file to be transmitted is receivable by the destination unless there is prior communication between the receiver and sender, for example, a bounce message from an earlier transmission attempt.

Hence, there is lacking, inter alia, a convenient and efficient manner for transmission of media files to a destination that is appropriately sized based on the size constraints within the origin, network and/or destination.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium that includes a system (and method) to process a media file for transmission. The system is configured to identify a media file for transmission, determine a size of the media file, identify one or more destinations for transmission of the media file and determine a threshold size for transmission of the media file for each of the identified one or more destinations. The system optionally provides for display an indication of the identified one or more destinations exceeding the threshold size for transmission.

For each of the identified one or more destinations exceeding the threshold size for transmission, the system sets a crop (or trim) window for the media file. The crop window is within the threshold size. The system determines a portion of the media to crop in response to a location of the crop window and generates a cropped media file based on the location of the crop window. The generated cropped media file has a size within the threshold size. The system transmits the cropped media file to the identified one or more destinations.

Example Mobile Computing Device

Figure 1A:
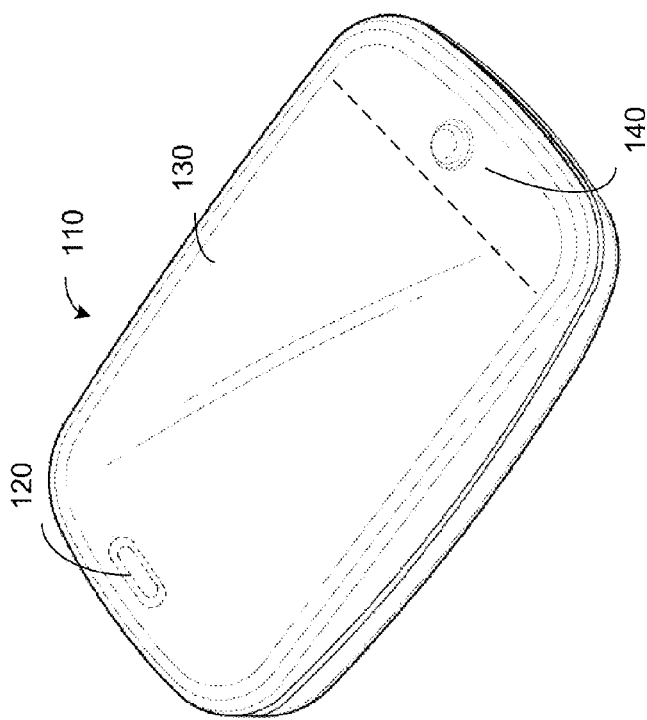
FIG. 1a illustrates one embodiment of a mobile computing device in a first positional state.
Figure 1B:
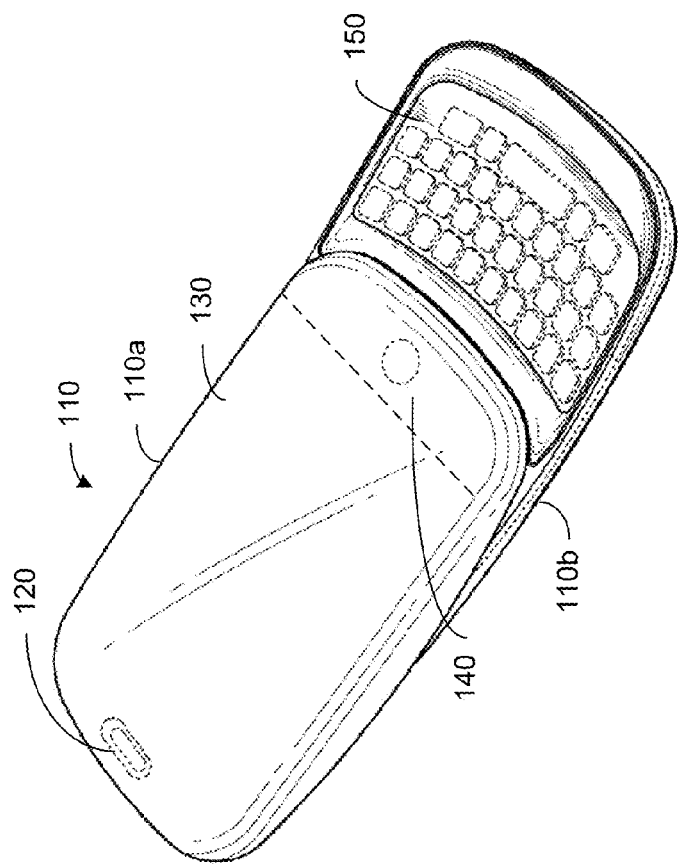
FIG. 1b illustrates one embodiment of the mobile computing device in a second positional state.

In one example embodiment, the configuration as disclosed may be configured for use between a mobile computing device, that may be host device, and an accessory device. FIGS. 1a and 1b illustrate one embodiment of a mobile computing device 110. FIG. 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, smartphone, netbook, or laptop computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other computing devices, e.g., desktop computers, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
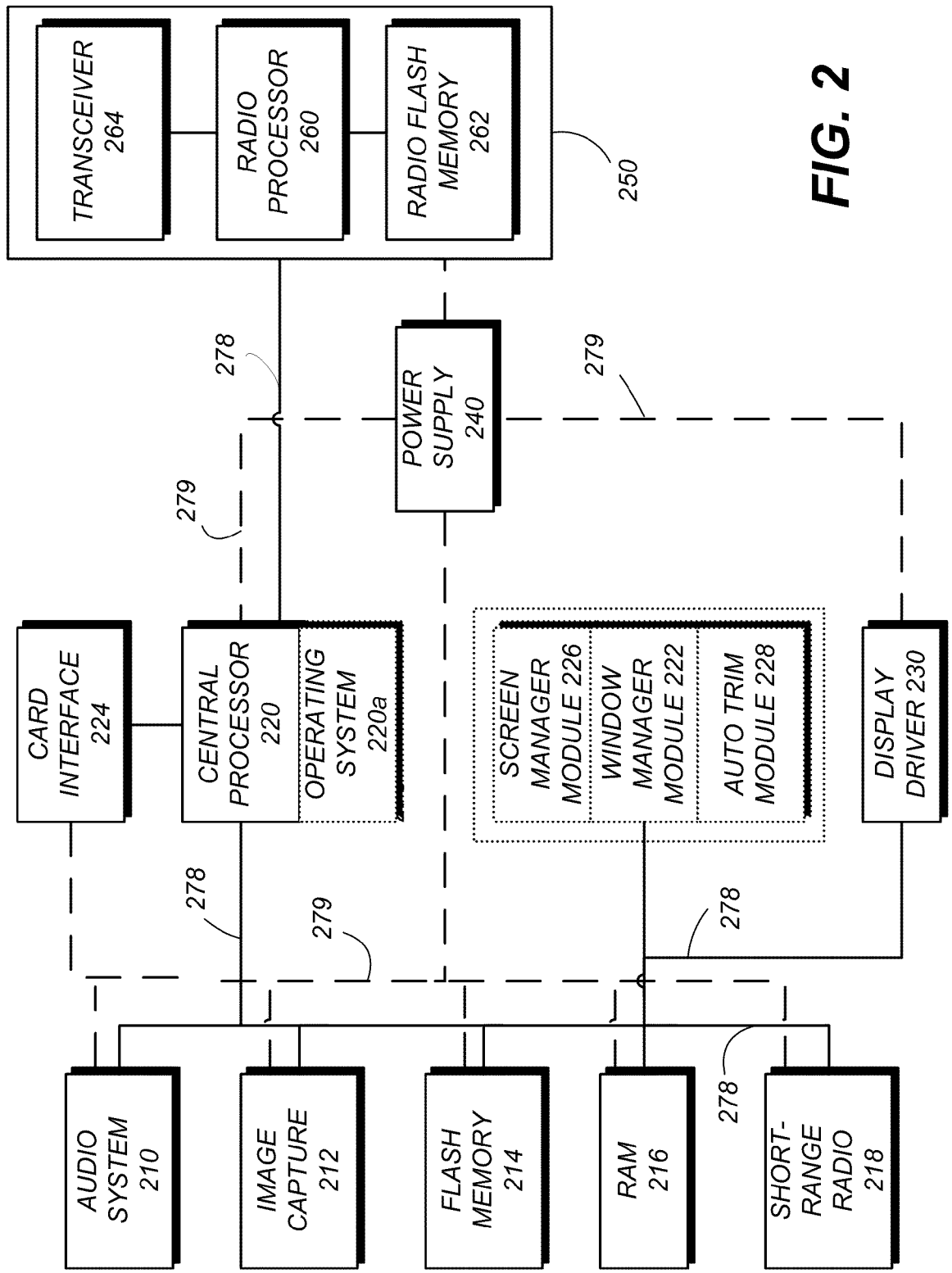
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIGS. 1a and 1b. The mobile computing device 110 includes a central processor 220, a power supply 240, and a radio subsystem 250. Examples of a central processor 220 include processing chips and system based on architectures such as ARM (including cores made by microprocessor manufacturers), ARM XSCALE, AMD ATHLON, SEMPRON or PHENOM, INTEL XSCALE, CELERON, CORE, PENTIUM or ITANIUM, IBM CELL, POWER ARCHITECTURE, SUN SPARC and the like.

The central processor 220 is configured for operation with a computer operating system. The operating system is an interface between hardware and an application, with which a user typically interfaces. The operating system is responsible for the management and coordination of activities and the sharing of resources of the mobile computing device 110. The operating system provides a host environment for applications that are run on the mobile computing device 110. As a host, one of the purposes of an operating system is to handle the details of the operation of the mobile computing device 110. Examples of an operating system include PALM OS and WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and IPHONE OS), GOOGLE ANDROID, and LINUX.

The central processor 220 communicates with an audio system 210, an image capture subsystem (e.g., camera, video or scanner) 212, flash memory 214, RAM memory 216, and a short range radio module 218 (e.g., Bluetooth, Wireless Fidelity (WiFi) component (e.g., IEEE 802.11)). The central processor communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor communicates with applications executing within the mobile computing device 110 through the operating system 220a. In addition, intermediary components, for example, a window manager module 222 and a screen manager module 226, provide additional communication channels between the central processor 220 and operating system 220 and system components, for example, the display driver 230.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

An auto trim module 228 comprises a software (e.g., integrated with the operating system) or firmware. The auto trim module 228 may also be configured to be an application operational with the operating system. As an application the auto trim module may be in the flash memory 214 or in a network cloud, retrievable, e.g., through the short range radio 218 or radio subsystem 250 as needed. The auto trim module 228 is configured to determine size constraints corresponding to transmission of a media file and automatically trim (or crop) the media file in order to transmit the media file without hindrance of the size constraints. The auto trim module 228 is further described below.

It is noted that in one embodiment, central processor 220 executes logic (e.g., by way of programming, code, or instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

Media File Processing Configuration

Figure 3:
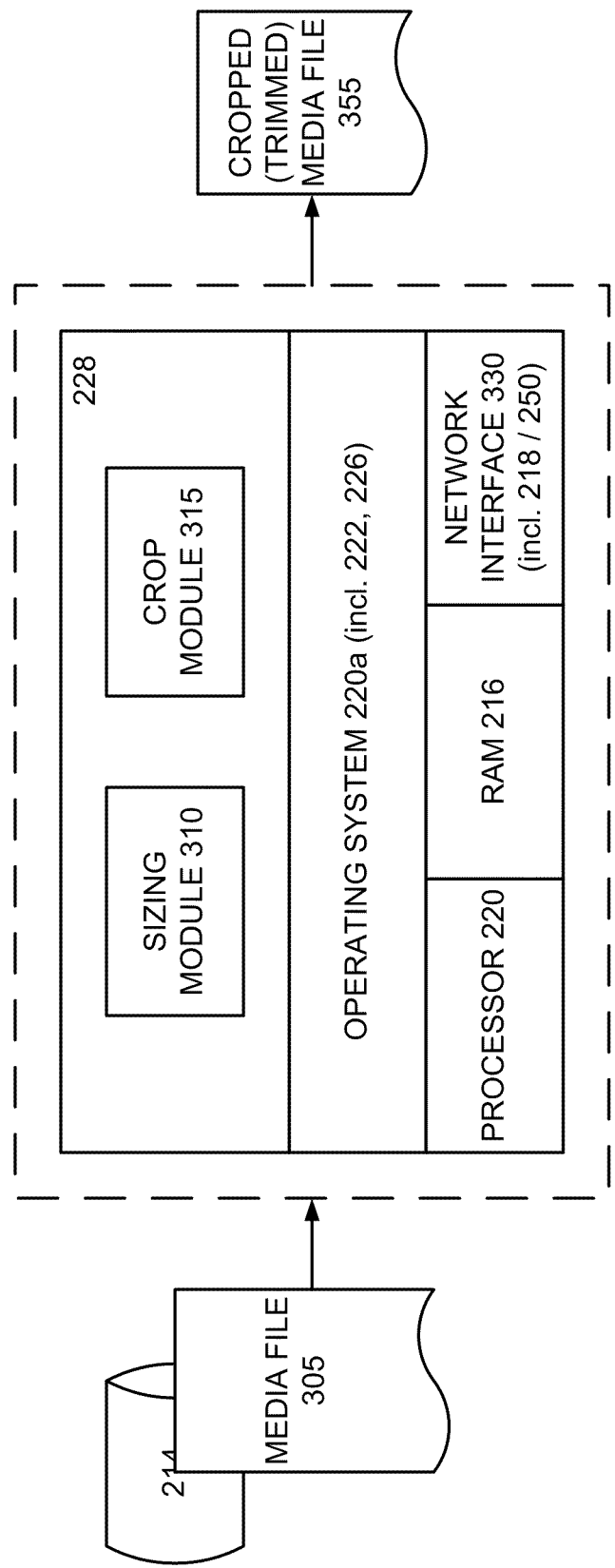
FIG. 3 illustrates one embodiment of an auto trim module.

FIG. 3 illustrates one embodiment of an auto trim module 228. The auto trim module 228 is configured to automatically crop (or trim) a media file 305 (e.g., stored in flash memory 214) to generate a cropped media file 355. The auto trim module 228 includes a sizing module 310 and a cropping (or trimming) module 315. It is noted that examples of a media file include video files (e.g., having formats such as .3g2, .3gp, .asf, .avi, .flv, .mov, .mp4, .mpg, .wmv, and the like), audio files (e.g., having formats such as .aac, .iff, .m3u, .mid, .mp3, .mpa, .ra, .wav, .wma, and the like), and image files (e.g., .3dm, .ai, .bmp, .drg, .dwg, .gif, .jpg, .pdf, .png, .psd, .psp, .tif, and the like).

In the illustrated example embodiment, the auto trim module 228 operates with the operating system 220a, including window manager module 222 and screen manager module 226 and other components of FIG. 2 (some of which are illustrated in FIG. 3). It is noted that the network interface 350 comprises a network interface through which the mobile computing device 110 communicates across a network, e.g., through the short range radio 218 and/or radio subsystem 250, with another device coupled with the network.

In the auto trim module 228, the sizing module 310 is configured to determine a threshold size for transmission and a size of a media file for comparison against a threshold size. The threshold size comprises a maximum size for a media file after which the media file cannot be appropriately transmitted, e.g., cannot be transmitted from a source (e.g., from an application in the mobile computing device 110) or received at a destination (e.g., by an application at a receiving device). The threshold size may be predetermined by a predefined value and/or may be predetermined based on the transmission path to be used for transmission and receipt of the media file. An example of predetermined threshold size on the source side include, for example, a predefined application limit on file transfer size or a policy on file transfer size set from within an organization. An example of a predetermined threshold corresponding to a network is a physical limitation on network transmission and/or receiving bandwidth or a policy on network bandwidth usage set by an organization, e.g., pre-pay to transmit or receive file only up to a predetermined size (for example, 10 megabytes (MB) in size). An example of a predetermined threshold size on the destination side is a predefined application limit on received file sizes (e.g., mailbox limit of 10 MB or download limitations by a network provider) or a policy on file receipt size set from within an organization. Another example of a predetermined threshold may include a predetermined threshold corresponding to a transmission medium, e.g., physical or logical. Yet another example of a predetermined threshold includes a network configuration, e.g., limits placed by operators of the network.

The cropping module 315 is configured to crop (or trim) the media file to be within (e.g., not to exceed or at or below) the threshold size. The cropping module 315 identifies the threshold size and determines an appropriate crop window. A crop window provides a start point and end point that corresponds with the threshold size so that the file will not exceed the threshold size. In one embodiment, the crop window may be provided for display against a media file on a screen 130 of the mobile computing device 110. The crop window may be displayed as a timeline and configured so that a default is a start point that corresponds with the start of the media file and an end point corresponds to the threshold size relative to the overall file size of the media file. The cropping module 315 may leave the units for the crop in terms of physical size, e.g., megabytes for files, or may convert the physical size to a unit of measure that may be more meaningful for a user in a particular context, e.g., time of play for media files such as video or audio or pixel size for media files such as photos and graphics.

By way of example, consider a video file as a media file. The threshold size for to send this file via a multimedia messaging service (MMS) is predefined as 5 megabytes (MB). The video file to be transmitted is 10 MB. The cropping module 315 in one embodiment determines a 5 MB threshold size corresponds to a play time of 2 minutes. The cropping module 315 and crops the video file to the first 5 MB and provides for display a crop window that is time based. The time based crop window includes a start point at ts=0 and an endpoint at te=1, which corresponds to 1 minute (or 5 MB in this example). The cropping module 315 also provides for display a movable timeline, e.g., a slider mechanism, which allows a user interfacing with the display 130 on the mobile computing device 110 to move the crop window. For example, the user may move the crop window to the last half of the video file so that ts=1 and te=2. The cropping module 315 is configured so that the user can either move the entire crop window anywhere within the 2 minute overall window of the 10 MB video file, but at no point is greater than the 1 minute (or 5 MB in this example) crop window. In addition, in some embodiments either the start point, ts, or the end point, te, can be moved, but in doing so, such movement can only cause the crop window to shrink and not expand so that the threshold size is not exceeded.

Figure 4:
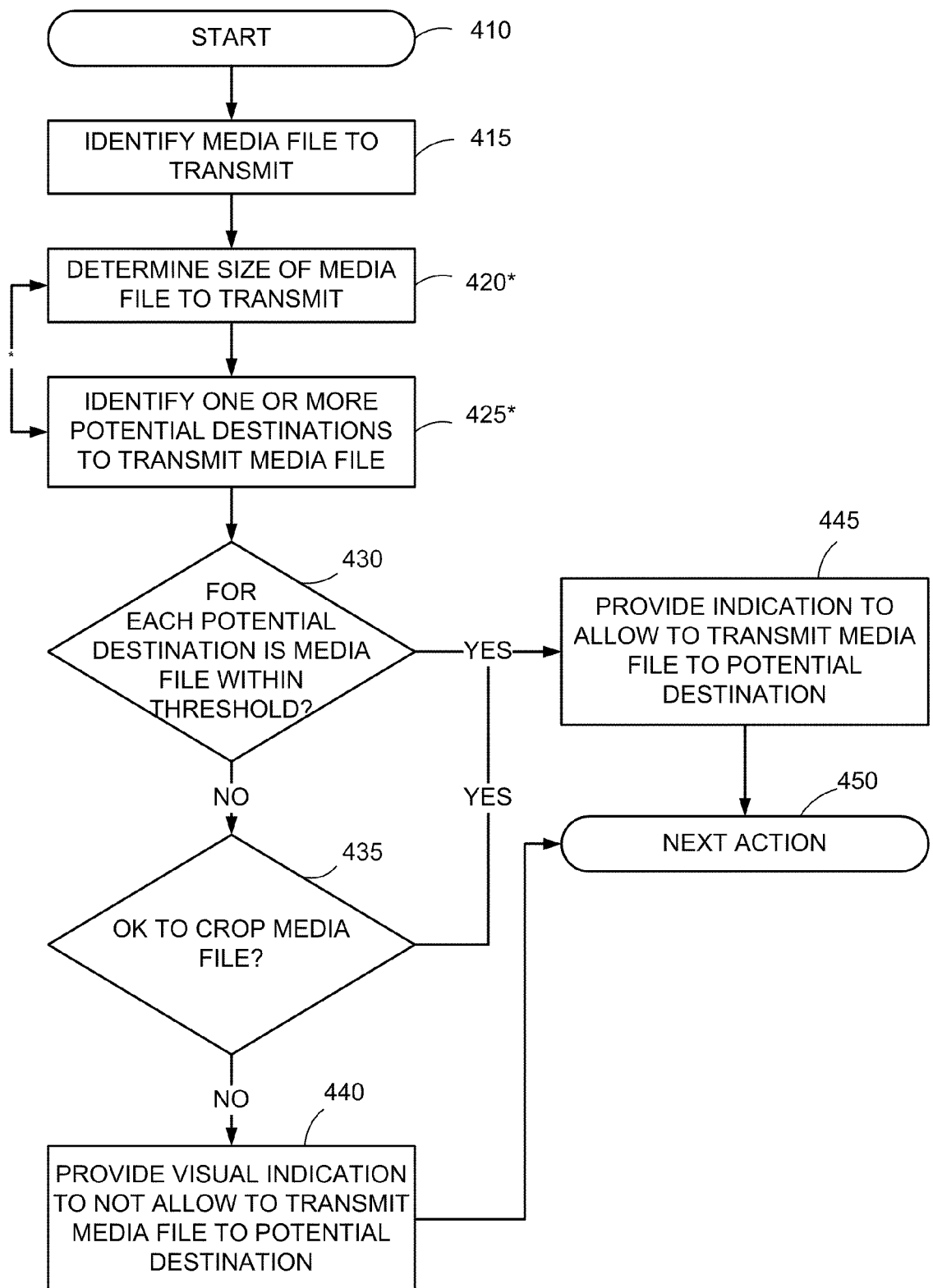
FIG. 4 illustrates one embodiment of a process for preparing a media file for transmission across a network.

FIG. 4 illustrates one embodiment of a process for preparing a media file for transmission across a network. The process starts 410 and identifies 415 a media file to transmit. The process determines 420 the size of the media file to transmit and identifies 425 one or more potential destinations to transmit the media file. It is noted that the step of determining 420 and identifying 425 can be swapped or performed in parallel. In addition, the one or more potential destinations may be along different transmission configurations. For example, one potential destination may be a telephone number using multimedia messaging service (MMS) and another potential destination may be an email address using an email service.

The process determines 430 for each potential destination whether the size of the media file is within a predetermined threshold (or file size limit). The predetermined threshold is dependent upon the transmission configuration that would be used to transmit the media file. IN addition, the predetermined threshold may also rely upon factors on the source side, network, or destination side as noted previously. If the process determines 430 the media file is within the predetermined threshold, the process provides 445 an indication to allow transmission of the media file to potential destinations that are selected. In such instances, the next action 450 could be transmission of the media file to the destination that met the predetermined threshold.

If the process determines 430 that the media file exceeded the threshold size, the process optionally provides a query for whether it is ok to crop the media file. The query may be provided as a visual inquiry on the screen 130 of the mobile computing device 110 and may require the user to affirmatively provide an indication of continuing with the cropping process. In an alternate embodiment the process automatically is configured to affirmatively crop (or trim the media file). Where the process determines 435 that cropping is not to take place the process provides 440 a visual indication on the screen of the mobile computing device that the media file cannot be transmitted to the potential destination. In such instances there may be no next action 450 or other files that meet the threshold size restrictions may be transmitted. Where the process determines 435 the media file can be cropped, the process continues on with cropping (or trimming) of the media file.

Figure 5:
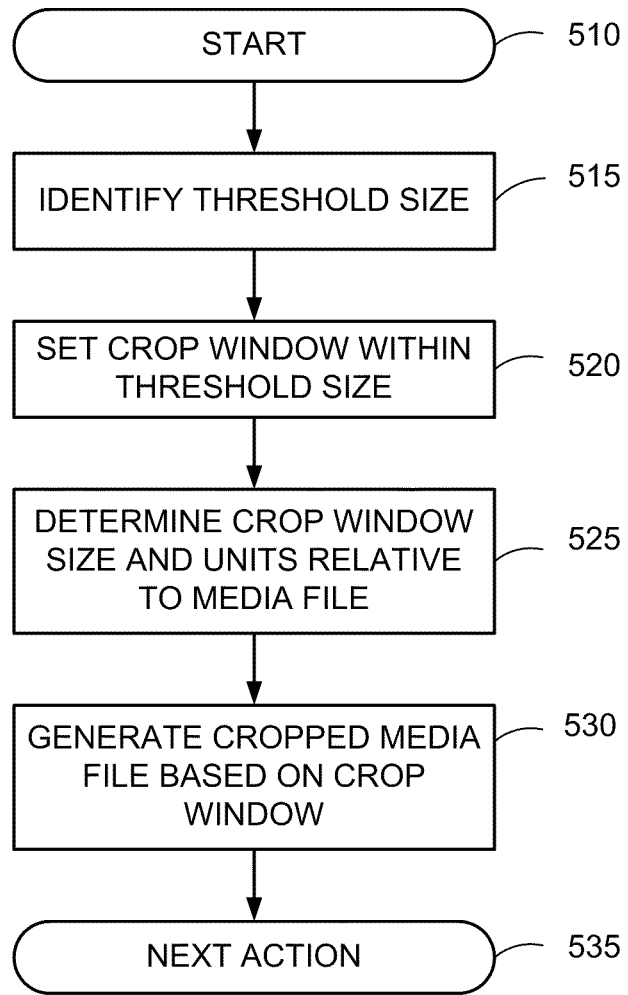
FIG. 5 illustrates one embodiment of a process for cropping a media file for transmission across a network.

FIG. 5 illustrates one embodiment of a process for cropping a media file for transmission. In one embodiment, the process is carried out by the sizing module 310 and the cropping module 315 of the auto trim module. It is noted that although two modules 310, 315 are noted, the modules may be configured within one module.

The process starts 510 and the sizing module 310 identifies 515 the threshold size corresponding to the potential destination. This part of the process includes looking to any limits that may exist from the source end, the destination end or the network as previously noted. With the threshold identified, process continues and the cropping module 315 determines 525 the crop window size relative to the media. As noted previously, this may be done on just a unit of data size or the process can be configured to find a corresponding value in another unit. For example, a video or audio crop window can be shown in terms of size of the file or a conversion to a corresponding time window. Similarly, in an example for image data the size, the crop window can be shown in terms of the size of the file or a conversion to a corresponding pixel size.

The crop window may be displayed in a default location or size relative to the media file or may optionally be provided with a mechanism, e.g., a slider or radio buttons, that can be triggered to move the crop window to change the start point and end point (e.g., for video files or audio files) or change the size of the media file shown (e.g., for image files). The process then generates 530 a cropped media file based on the cropped window size. The next action 535 may include saving the cropped media file and/or transmitting the cropped media file. Returning to FIG. 4, process can be configured to provide 445 and indication of allowable transmission of the cropped media file to potential destinations.

Figure 6A:
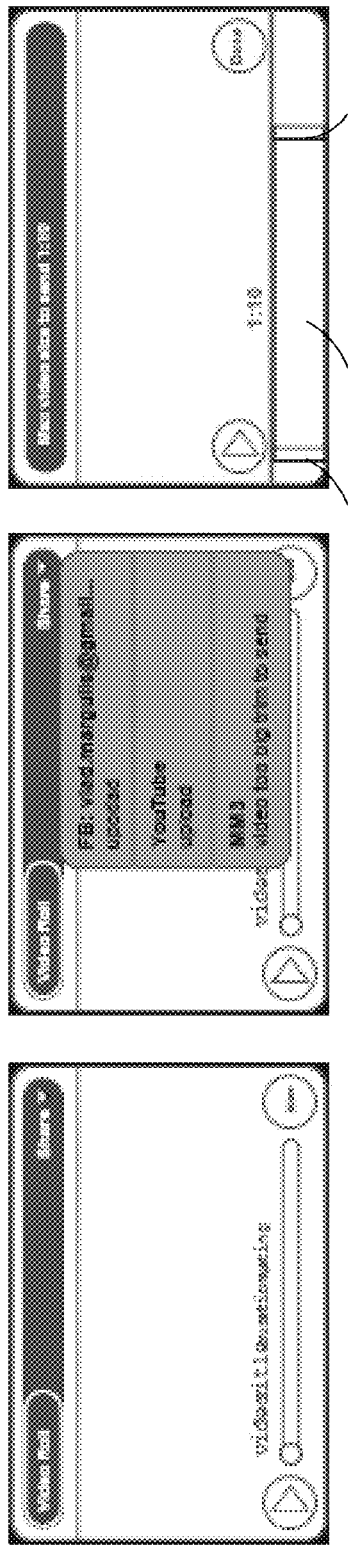
FIGS. 6a and 6b illustrate one embodiment of example visual views for preparing a media file for transmission across a network.
Figure 6B:
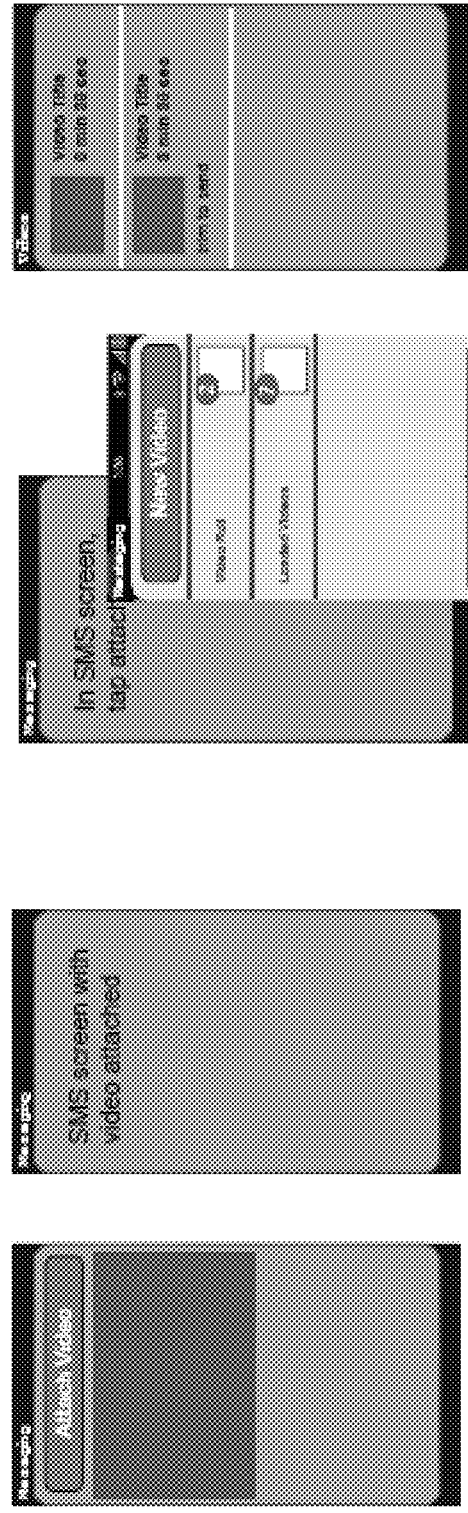

Turning now to FIGS. 6*a* and 6*b*, illustrated is one embodiment of example visual views (or user interfaces displayable on a screen 130 of a mobile computing device 110) for preparing a media file for transmission across a network. In this example, a media file for transmission is a video file. The video file for transmission is selected through the mobile computing device 110. In FIG. 6*a*, on the screen 130 of the mobile computing device 110 illustrated is the full video file in (1). In (2), through a menu of potential destinations for the video file are shown. In this example, the menu is a SHARE menu. In one embodiment, the SHARE menu is pre-populated with potential destinations, included and identifier of the destination and corresponding address, e.g., email address, web site log in credentials, or phone number. In alternate embodiments, the SHARE menu is configured to access particular data stores in the mobile computing device 110, e.g., contact data store or saved web site data stores, and pulls relevant data to populate the destination information within the SHARE menu.

Also illustrated with the SHARE menu is whether the video file can be transmitted to the potential destination. In this example, the video file can be transmitted to an application, e.g., FB (or FACEBOOK) at the email address shown, and to a video hosting web site, e.g., YOUTUBE. In this example, the video file cannot be transmitted via MMS as the video is too large. In order for the video to be transmitted via MMS it needs to be trimmed (or cropped). The auto trim module 228 crops (or trims) the video file, e.g., as described in FIGS. 3, 4, and 5. The cropped window is illustrated in (3) at 610 as being 1 minute, 10 seconds (1:10) with a start point 610*a* at the beginning and an end point 610*b* at the 1:10 mark.

FIG. 6*b* illustrates another visual embodiment corresponding to a sizing and cropping (or trimming) operation within a particular communication application. In this example, the communication application is a messaging application. In (1) the display shown on the screen 130 of the mobile computing device 110 includes a menu item to attach a video. In (2) a short message service (SMS) screen with video attached is illustrated. In (3) and (4) examples are shown of how the video may be attached. In (3) a user taps the screen 130 and a different user interface view is displayed on the screen 130. In (3) the available video file libraries are provided. Once one is selected, in (4) a video library with two video files is shown. Along with what is shown is the size of the video file of each. In this example, the second video file is indicated as needed to be cropped (or trimmed) in order to send through the messaging application. Hence, if that video file is selected by a user the video file can be automatically cropped (or trimmed) by the auto trim module 228 as previously described in FIGS. 3, 4, and 5.

It is noted that the media file may be transmittable through other transmission services and/or protocols in addition to SMS and MMS. For example, transmission of the media file can occur via Real Time Streaming Protocol (RTSP) or Hypertext Transfer Protocol (HTTP).

Thus, the described configurations include processing a media file for transmission. The system determines a size of the media file and a threshold size for transmission of the media file to a destination. In responsive to the size of the media file exceeding the threshold size for the destination, the system sets a crop window for the media file, the crop window within the threshold size and provides for display an overlay of the crop window relative to the media file. The system generates a cropped media file based on a position of the overlay of the crop window relative to the media file. The generated cropped media file has a size within the threshold size. The system transmits the cropped media file to the destination.

The disclosed embodiments beneficially allow for identifying and cropping (or trimming) media files from a source prior to transmission to a destination. The system and process saves time and increases transmission efficiencies by immediately identifying what files can and cannot be transmitted before they actually are transmitted. Moreover, the system and process beneficially provides controls over what aspects of the media files are cropped (or trimmed) and transmitted. Further the system and process continues to retain the original file, which can be further automatically cropped (or trimmed) for transmission if so desired.

In addition to the described configuration, the system can be further structured to provide other options once the detection activity occurs. For example, in addition to providing an option to crop, the configuration may also include an option to transcode through a transcoding module. The transcoding module can be configured to module to downsample the media files such as reduce an image or video resolution. Once transcoded, the media file can be cropped so that more of it can be transmitted due to smaller size resulting from downsampling.

Additional Configuration Considerations

Although the principles noted herein are in the construct of a networked configuration, it is applicable to other configurations. For example, the system and process can be configured for application in a storage environment. In one embodiment, where there is limited storage available on a storage medium for a media file, the system and process can determine the amount of storage available on the storage medium and crop the media file accordingly to fit with the storage medium. In such configurations, a user may be presented with a visual display as to size options available after cropping that would suffice to fit within the storage space available on the storage medium.

Some portions of above description describe the embodiments in terms of algorithms and symbolic representations of operations on information, for example, as illustrated and described with respect to FIGS. 3, 4, and 5. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for automatically trimming (or cropping) media files in order to transmit them within acceptable size constraints across from a source to destinations via a network through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for processing a media file for transmission, the method comprising:
   determining a size of the media file;
   determining a threshold size for transmission of the media file to at least one destination; and
   responsive to the size of the media file exceeding the threshold size of the at least one destination:
      setting a crop window for the media file, the crop window within the threshold size;
      providing for display an overlay of the crop window;
      generating a cropped media file based on a position of the overlay of the crop window relative to the media file, the generated cropped media file within the threshold size; and
      transmitting the cropped media file to the at least one destination.

2. The method of claim 1, further comprising providing for display a selectable option for selection of a destination for determination of the threshold size.

3. The method of claim 1, further comprising providing for display a visual slider corresponding to the crop window, the visual slider having a first end corresponding to a start point and a second end corresponding to an end point.

4. The method of claim 3, wherein the media file comprises a video file format.

5. The method of claim 4, further comprising providing for display a video frame of the video file format.

6. The method of claim 1, wherein transmission is through one of a short message service and a multimedia message service.

7. The method of claim 1, wherein the transmission is through one of a real time streaming protocol and a hypertext transfer protocol.

8. A non-transitory computer readable storage medium configured to store instructions to process a media file, the instructions when executed by at least one processor causes the at least one processor to:
   determine a size of the media file;
   determine a threshold size for transmission of the media file to at least one destination; and
   responsive to the size of the media file exceeding the threshold size of the at least one destination:
      set a crop window for the media file, the crop window within the threshold size;
      provide for display an overlay of the crop window;
      generate a cropped media file based on a position of the overlay of the crop window relative to the media file, the generated cropped media file having a size within the threshold size; and
      transmit the cropped media file to the at least one destination.

9. The computer readable storage medium of claim 8, further comprising instructions that cause the at least one processor to provide for display a selectable option for selection of a destination for determination of the threshold size.

10. The computer readable storage medium of claim 8, further comprising instructions that cause the at least one processor to provide for display a visual slider corresponding to the crop window, the visual slider having a first end corresponding to a start point and a second end corresponding to an end point.

11. The computer readable storage medium of claim 10, wherein the media file comprises a video file format.

12. The computer readable storage medium of claim 11, further comprising instructions that cause the at least one processor to provide for display a video frame of the video file format.

13. The computer readable storage medium of claim 8, wherein transmission is through one of a short message service, a multimedia message service, a real time streaming protocol and a hypertext transfer protocol.

14. A method for processing a media file for transmission, the method comprising:
   determining a size of a media file;
   determining a threshold size for transmission of the media file to a destination;
   providing for display, in response to the size of the media file exceeding the threshold size, a crop window for the media file, the crop window to crop the media file within the threshold size; and generating a cropped media file based on a position of the crop window relative to the media file.

15. The method of claim 14, further comprising overlaying the crop window over the media file.

16. The method of claim 14, further comprising providing for display at least one selectable option for transmitting the cropped media file, the selectable option based on the cropped media file being within the threshold size.

17. The method of claim 14, further comprising providing for display a visual slider corresponding to the crop window, the visual slider having a first end corresponding to a start point and a second end corresponding to an end point, the visual slider configured to have a maximum selection within the threshold size.

18. The method of claim 17, wherein the media file comprises a video file format.

19. The method of claim 17, further comprising providing for display a video frame of the video file format.

20. The method of claim 14, wherein the media file comprises one of an image file or a media file and the method further comprising providing for display an option to transcode the media file to a lower resolution.

\* \* \* \* \*